June 8, 1926.
T. P. CAMPBELL
1,587,695
METHOD FOR THE PURIFICATION OF ZINC SOLUTIONS
Filed Sept. 8, 1925
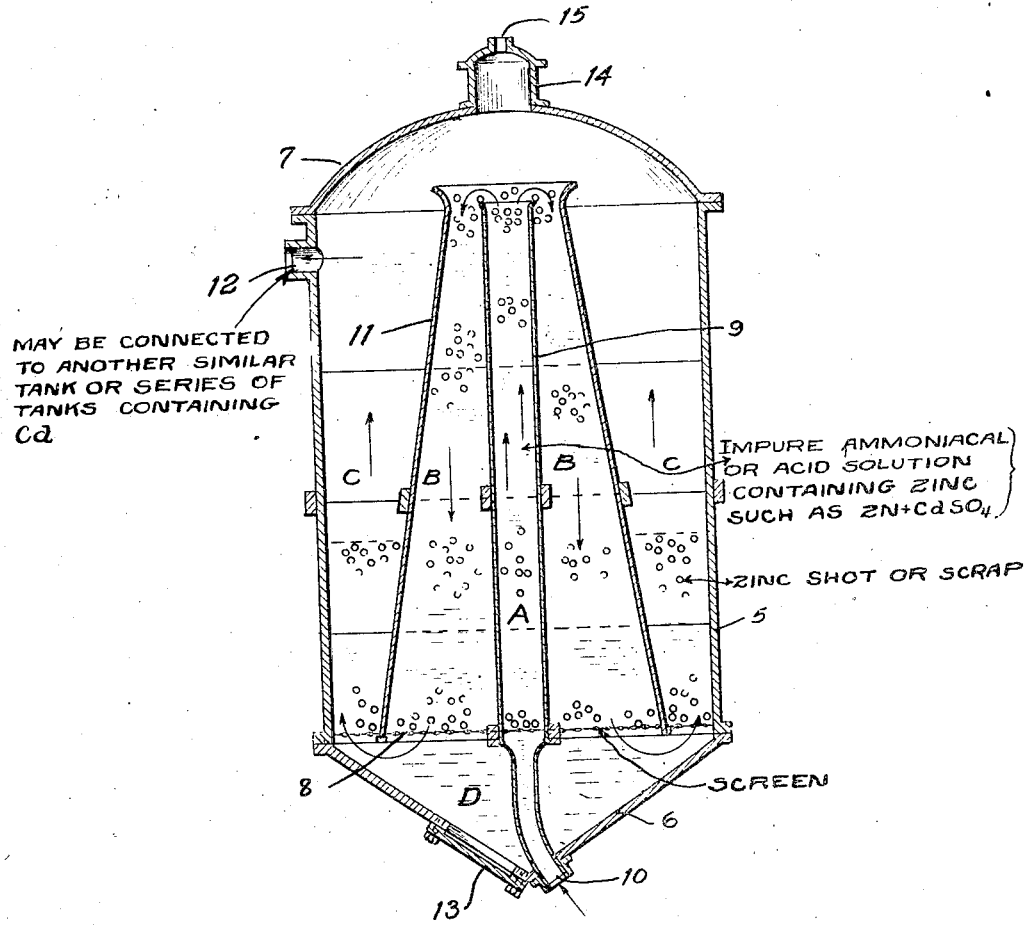
Inventor
Thomas P. Campbell.
By A. J. O'Brien
Attorney Patented June 8, 1926.

1,587,695

UNITED STATES PATENT OFFICE.

THOMAS P. CAMPBELL, OF DENVER, COLORADO.

METHOD FOR THE PURIFICATION OF ZINC SOLUTIONS.

Application filed September 8, 1925. Serial No. 55,022.

This invention relates to a method for the purification of zinc solutions.

Methods now in use consist, usually, of the following steps:—(a) neutralization and oxidation to remove iron, and (b) precipitation of Cu, Cd, etc. on zinc dust or scrap. Other steps are sometimes added for the more complete removal of Co, Ni, etc. when this is necessary.

Where an ammoniacal solution is employed, iron is not readily soluble, and in such cases it is only necessary to precipitate the Cu, Cd, etc. on zinc.

In cases where either acid or alkali solutions are employed, the removal of Cu and Cd is of prime importance. This is attended by many difficulties. Precipitated Cu and Cd—especially the latter—have a tendency to oxidize in the presence of air, and if this occurs, the oxides tend to go back into solution, precipitating the zinc as ZnO or forming basic salts of zinc. Once oxidation of this type sets in, it becomes very difficult to remove the Cu and Cd.

In different plants, air and mechanical agitators are employed for bringing about precipitation on zinc. Where air is employed there is a marked tendency towards oxidation and a consequent increase in the amount of zinc required. Where mechanical means are employed to produce the necessary agitation, the tendency towards oxidation is less marked and decreases in proportion as the contact with air is prevented.

Agitation, however effected, must be followed by settling and filtering or by filtration alone, usually in filter presses, so as to clarify the solution. These operations are costly both as regards the equipment necessary and the labor which they entail, and, besides this, they offer further chances for oxidation.

It is evident that the use of agitators is objectionable and that it is highly desirable to obtain the desired results by means that do not employ agitation.

I have found that if an impure solution of a zinc salt is allowed to percolate upwardly through a tower filled with loosely packed zinc shot, the Cu and Cd will be removed to an extent sufficient to insure successful electro-deposition of the zinc. Where a simple tower is employed the precipitated metals are carried over with the effluent liquors which therefore require subsequently to be filtered.

In order to obviate the last-named difficulty, I have invented an apparatus which I will now describe in detail, reference for this purpose being had to the accompanying drawing where the single view shows a vertical diametrical section through the apparatus.

My apparatus or tower consists of a metal cylinder 5 of any suitable size and may be about five feet in length and three feet in diameter. The lower end of this cylinder is closed by means of a conical cover 6, while the upper end thereof is closed by a convex or spherical cover member 7. Secured to the inside of the cylinder near its lower end is a metal screen 8 having about four meshes to the inch. A cylindrical member or tube 9 extends upwardly centrally of the cylinder. The lower end of this tube opens outwardly through the side of the conical member 6, as indicated by numeral 10 and has its upper end at or about the level of the upper end of the cylinder 5. The member 9 is enclosed by a conical casing 11 which rests on the screen 8 or on suitable supports adjacent to the screen. The cylinder 5 is provided near its upper end with an outlet 12. It will be noticed that the chamber formed by the cylinder 5 and the ends 6 and 7 is divided into four compartments by the screen 8 and members 9 and 11. These compartments have been designated by letters A, B, C, and D. Compartments A and B are completely filled with zinc shot scrap, turnings, etc., and compartment C is partially filled.

For use with ammoniacal solutions, the tower may be made of cast-iron or steel, but where acid solutions, such as $ZnSO_4$ are used, the iron, if used, must be lead lined. In the latter case other non-corrosive material such as wood is preferable.

The impure solutions enter at 10 and flow upwardly through the central compartment A, thence downwardly through the compartment B and upwardly through compartment C, thence out through 12. As the cross-sectional area of compartments A B and C increases in the order given, the solutions will have the highest velocity in compartment A where the rate of reaction is the greatest. It is essential that the velocity in compartment A shall be quite high, as the precipitated metals must be swept from the surfaces of the zinc shot by means of the upward movement of the solution.

The velocity of flow in compartment B is less than in compartment A and decreases towards the bottom as the area increases, but must be sufficiently great to prevent clogging and to carry the precipitated metals through the supporting screen 8 into the compartment D. The increased area of compartment C causes the velocity to be decreased to such an extent that settling takes place. The method should be so carried out that the precipitation will be completed in the compartment B and therefore only enough zinc is placed in C to prevent contamination due to slimes carried up from D. Where a large capacity is required, it may be desirable to use two such towers in series, as I have found, owing to the much greater velocities that may be maintained, two towers in series will have a capacity of more than three times that of a single tower. The use of high velocities is desirable, as clogging is not noticed while there is a constant tendency to clog at low velocities.

The precipitated metals and sludge are collected in compartment D, from which they may be removed through the manhole 13, or they may be taken out continuously by means of, say, a drain inserted in the bottom of the cover 6. If it should be found desirable to recover the Cu and Cd separately, this may be accomplished by the use of two towers, or two sets of towers connected in series. In the first tower or sets of towers, I use cadmium instead of zinc. The cadmium metal may by in any suitable form such as shot, turnings, sticks, etc. The second tower or sets of towers employ zinc as above described. When the solution passes through the first tower, the Cu. is separated in accordance with the following formula

$$Cd+CuSO_4=Cu+CdSO_4$$

After the solution has passed through the first tower or sets of towers, it is then passed through the second tower or sets of towers where separation takes place in accordance with the following formula

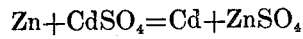
$$Zn+CdSO_4=Cd+ZnSO_4$$

Should the surfaces of the metals used for precipitation become wholly or partially inactive due to oxidation, clogging or similar causes, it is only necessary to add a small amount of the same metal (as that in the tower); in finely divided form, such as that obtained by atomizing "blue powder," etc. to the impure solutions just before they enter the tower in question. The amount of metal thus added will usually be less than that required by the above equations; but in any case the exact amount to be added must be left to the discretion of the operator.

The top of the tower is provided with a dome 14 having an opening 15 through which the generated gases may escape.

The apparatus shown and described is illustrative only and the method may be carried out by means that are specifically different than that shown, but which are the equivalent for the purpose.

Having now described my invention, what I claim as new is:—

1. The method for the purification of zinc solutions, which consists in causing the solution to percolate successively through separate compartments containing loosely packed particles of metallic zinc, each successive compartment being of greater area whereby the velocity of the solution decreases.

2. The method for the purification of zinc salt solutions containing salts of more negative metals which consists in causing the solution to percolate upwardly through a compartment containing loosely packed particles of metallic zinc, thence downwardly through a second compartment of larger transverse area which also contains metallic zinc particles, thence upwardly through a third compartment of still greater area, which contains loosely packed particles of metallic zinc.

3. The method of purification of impure zinc solutions, which consists in causing the solution to percolate at decreasing velocities through separate compartments containing loosely packed metallic zinc articles.

4. The method of purification of impure zinc solutions, which consists in causing the solution to percolate upwardly through a mass of loosely packed zinc particles at a velocity sufficiently great to carry along the precipitated metals, then causing the solution to percolate downwardly through a second compartment containing loosely packed particles of metallic zinc, the velocity of flow through the second compartment being less than in the first compartment, but sufficiently great to prevent clogging and then passing the solution through a third compartment at a velocity which permits settling to take place.

5. The method of purification of impure zinc solutions, which consists in causing the solution to percolate upwardly through a mass of loosely packed zinc particles at a velocity sufficiently great to carry along the precipitated metals, then causing the solution to percolate downwardly through a second compartment containing loosely packed particles of metallic zinc, the velocity of flow through the second compartment being less than in the first compartment, but sufficiently great to prevent clogging and then passing the solution through a compartment adapted to receive the precipitated metals, after which the solution is caused to flow upwardly through a compartment, of comparatively large area, containing zinc particles, the velocity of flow through the last compartment being so low that settling will take place.

In testimony whereof I affix my signature.

THOMAS P. CAMPBELL.